Sept. 13, 1966  R. G. ECKARD  3,272,006
TENSION AND COMPRESSION LOAD-MEASURING DEVICE
Filed July 25, 1963  3 Sheets-Sheet 1

Sept. 13, 1966  R. G. ECKARD  3,272,006
TENSION AND COMPRESSION LOAD-MEASURING DEVICE
Filed July 25, 1963  3 Sheets-Sheet 2

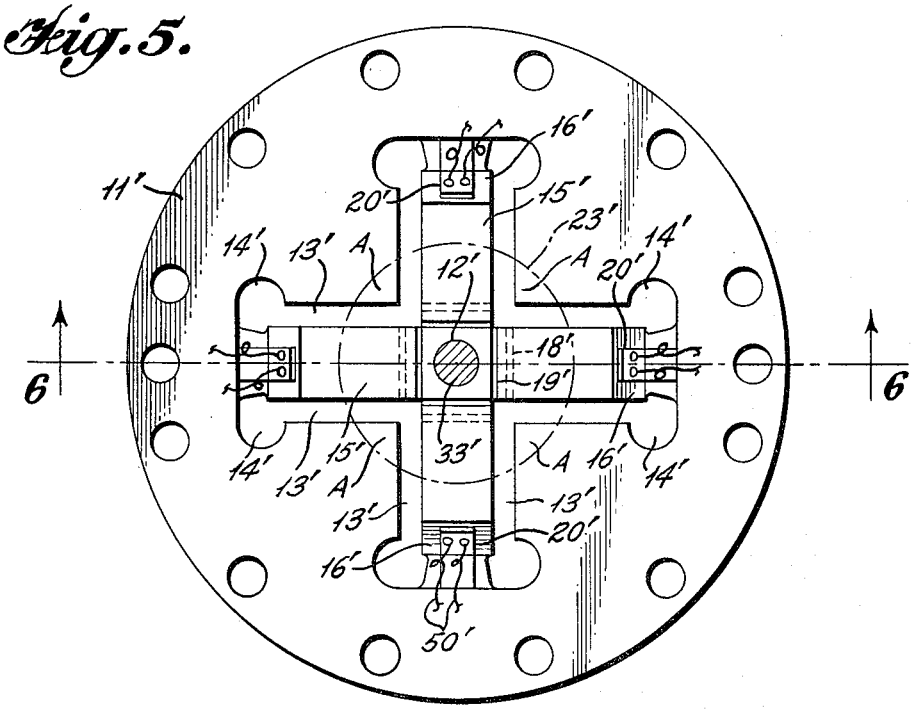
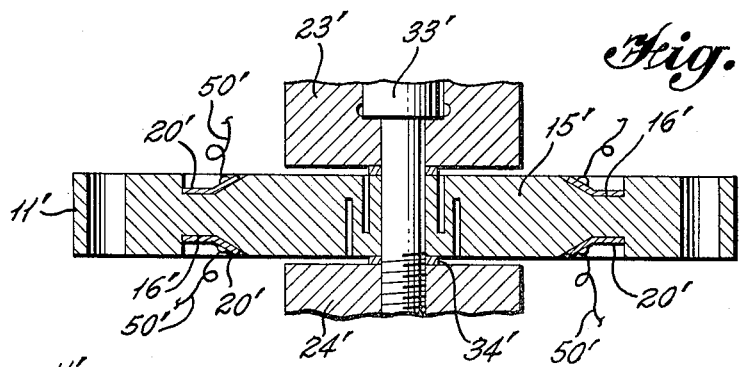
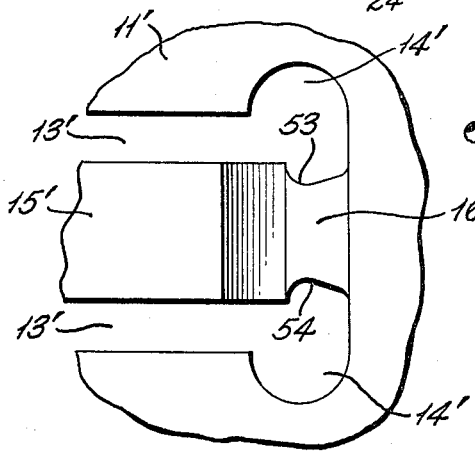

United States Patent Office 3,272,006
Patented Sept. 13, 1966

3,272,006
TENSION AND COMPRESSION LOAD-MEASURING DEVICE
Ronald G. Eckard, Cumberland, Md., assignor to Allegany Instrument Company, a division of Textron Electronics, Inc., Cumberland, Md., a corporation of Delaware
Filed July 25, 1963, Ser. No. 297,712
3 Claims. (Cl. 73—141)

This invention relates to a force-measuring device for tension or compression forces and more particularly to a device providing a novel self-contained load-sensing element with substantially axial overload stops.

An object of the invention is the provision of a force-measuring device for tension and compression loads which has an extremely high sensitivity to applied loads, but which measures such loads with an extremely low degree of deflection.

Another object of the invention is the provision of a force-measuring device which is inherently insensitive to changes in barometric pressure.

A further object of the invention is the provision of a balanced, pressure-compensated, force-measuring device in which the operative parts are afforded protection from atmospheric pressure changes and, while sealed, are not vented.

Yet another object of the invention is the provision of a force-measuring device to which either tension or compression loads may be easily applied.

Still another object of the invention is the provision of substantially axially aligned overload protection, and more especially of an improved stop action which not only prevents mechanical failure or breakage, but also allows continued substantially axially aligned overload protection.

Another object of the invention is the provision of an improved stop action which not only prevents mechanical failure or breakage, but also allow continued operation of the load cell within its range without affecting the subsequent operation of the device when the load returns to the operating range. The zero does not shift nor is correction of the measuring circuit necessary.

The invention is also intended to provide a force-measuring device of simple and efficient design of precise, rigid construction whereby the device is capable of high output within small dimensions and is reliable and uniform in operation.

A further object is the provision of improved construction which reduces eccentric loading, on the load-sensing element, and permits adjustment of the linearity characteristic.

The invention will be better understood from a consideration of the following specifications taken in conjunction with the accompanying drawings in which:

FIG. 5 is an illustration of the invention employing a four arm load-sensing element;

FIG. 6 is a section taken on the line 6—6 of FIG. 5; and

FIG. 7 is an enlarged fragmentary plan view showing the end of the load-sensing element, necked down to increase its sensitivity.

Figure 2:
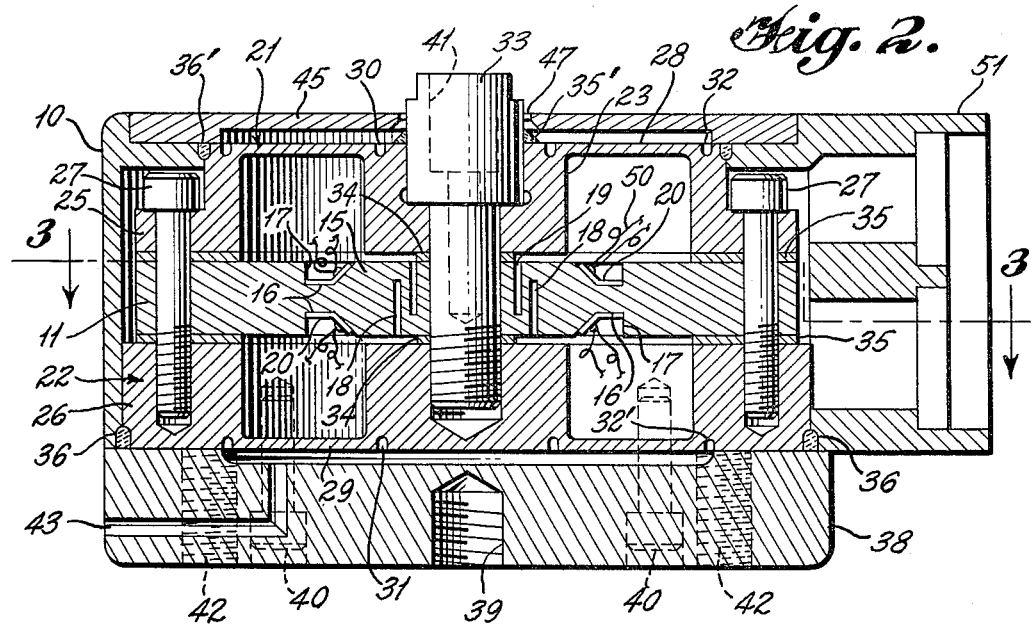
FIG. 2 is a vertical section of the device shown in FIG. 1.
Figure 3:
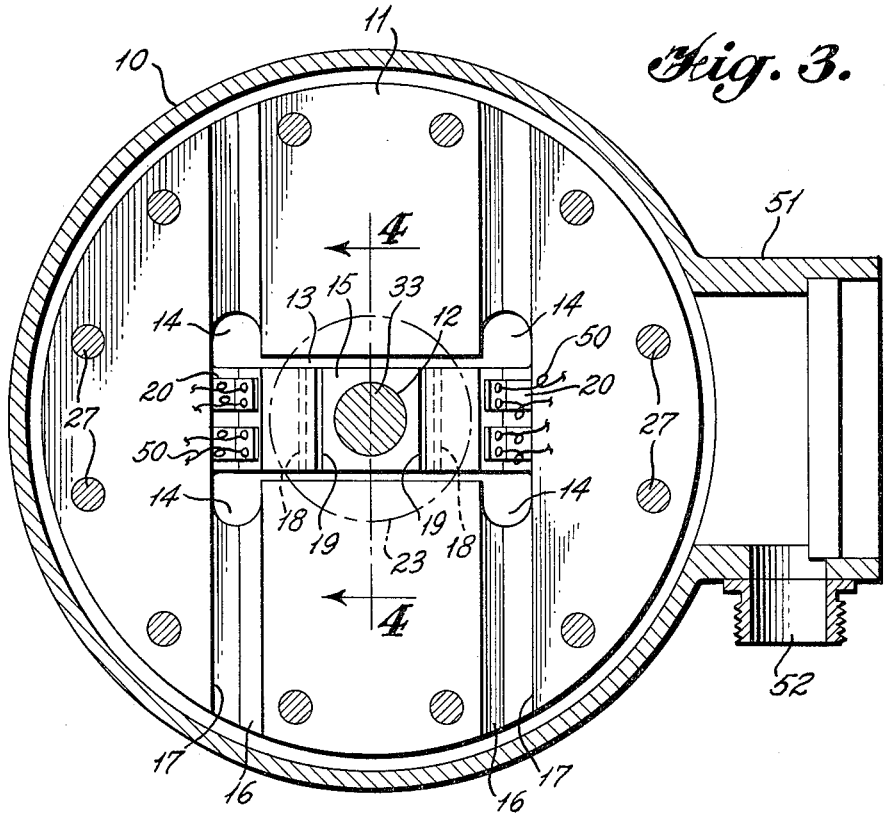
FIG. 3 is a section taken on the line 3—3 of FIG. 2, showing the top plan of the force-sensing element.

The force-measuring device illustrated in the drawings comprises an annular housing 10 into which is fitted a force-measuring unit consisting of a rigid circular flat plate 11 having a generally solid annular periphery. Plate 11 is formed with a centrally located hole 12. Slots 13 are milled through plate 11 between pairs of holes 14 symmetrically placed with respect to hole 12. Slots 13 are parallel and when milled, form a beam 15. Grooves 16 are milled or formed in both sides of plate 11 and extend perpendicular to the axis of beam 15 and are arranged symmetrically with respect to hole 12, forming the end or termination of beam 15. Each groove 16 has an upstanding wall 17 outwardly from the center of plate 11 to from a definite end of the beam. Grooves 16 may extend across the entire width of plate 11 or just across the end of beam 15. As shown in FIG. 2, plate 11 and beam 15 are diminished in cross-section area at the end by grooves 16. The remainder of each groove 16 is formed with a substantially flat portion that is, flat with respect to the plane of plate 11 and a generally sloping portion extending therefrom to the surface of plate 11. The flat portion and sloping portion may be arcuate in shape.

As shown in the drawings, beam 15 is further formed with transverse slots symmetrically spaced with respect to the hole 12 in beam 15 as shown at 18 and 19. Slots 18 and 19 extend from opposite faces of plate 11 and overlap as shown in FIGS. 2 and 6.

Beam 15 thus formed in plate 11 affords a flexure. When electrical impedance strain gages 20 are applied to the ends of beam 15 in grooves 16, the reduced cross-section of the beam as shown in FIGS. 2 and 6 of the flexure or beam 15 provides a load-sensing element. As loads are applied along the axis of hole 12, the geometry of beam 15 is such that only those portions of the beam where strain gages 20 are located are highly stressed. The remainder of the beam has a much higher cross-sectional moment of inertia which keeps the deflection relatively low thus providing a high natural frequency and allowing sufficient movement to effect measurement of the strain in a compact space.

On each side of plate 11 are side members 21 and 22. Each side member 21 and 22 has a centrally located cylindrical load-transmitting portion 23 and 24 respectively, and peripheral annular ring portions 25 and 26 substantially coextensive with the outer periphery of plate 11. The inner diameters of ring portions 25 and 26 are the same, and the radial distance of each to the cylindrical portions 23 and 24 is the same. The outer portions of rings 25 and 26 are formed to permit bolts 27 to secure ring portions 25 and 26 to plate 11 in a firm assembly. The edges of the cylindrical portions 23 and 24 and the outer edges of rings 25 and 26 remote from plate 11 are interconnected by side plates 28 and 29. Members 23, 25 and 28 may be made integrally by milling a plate to form portions 23, 25 and 28 or they may be fabricated by welding three performed parts into assembled relationship, as shown in FIG. 2. Members 24, 26 and 29 may similarly be formed integrally or by welding. Grooves 30 and 31 are of the same diameter and grooves 32 and 32' are of the same diameter and are formed in members 21 and 22. They are referred to as stress isolation grooves so that the bending of the portion 28 of member 21 and portion 29 of member 22 will be similar.

Figure 4:
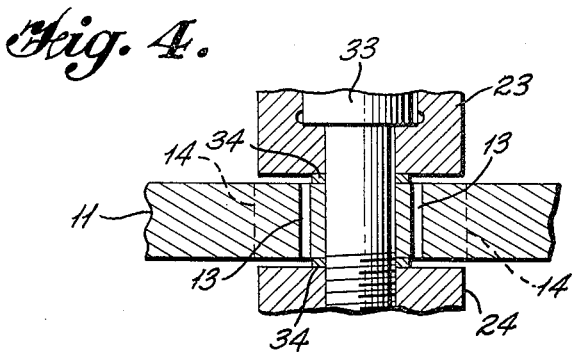
FIG. 4 is a fragmentary, vertical section of the element taken along the line 4—4 of FIG. 3.

Cylindrical portion 23 of member 21 is shown in FIG. 2, formed to receive bolt 33 and a portion of its head. Cylindrical portion 24 of member 22 is shown in FIG. 2 to be threaded to receive the threaded end of bolt 33. Shims 34 are shown positioned between cylindrical portion 23 and beam 15 and cylindrical portion 24 and beam 15. Shim 34 does not exceed in diameter the distance between slots 19 as shown in FIG. 4. Shims 35 extend between plate 11 and members 21 and 22 and are bolted securely therebetween to maintain these parts in assembled relationship. Bolt 33 forms a rigid, composite assembly between cylindrical portions 23 and 24 of side members 21 and 22 and plate 11 holding shims 34 firmly therebetween. When bolt 33 is securely holding the parts in assembled relationship, it is welded to member 21 as shown at 35'. When the assembly consisting of members 21, 11 and 22 is bolted and welded together as a unit, it is inserted in housing 10 and welded as shown at 36', in the housing to form a firm integral assembly.

Mounting plate 38 has a threaded hole extending partially therethrough at 39. The mounting plate is held in place by a plurality of bolts 40 threaded into annular member 22. Threaded hole 39 in mounting plate 38 and threaded hole 41 in bolt 33 can then be used to receive threaded studs to place tension or compression loads on the unit.

Other threaded holes 42 are shown in the mounting plate to afford an alternate mounting means for assembling the mounting plate to a structure whereby the tension or compression loads would be applied to the force-measuring device between a threaded member in hole 41 and the structure.

Weld 36 when completed is ground flat and polished so that mounting plate 38 abuts plate 22 and forms a flat sealed joint. Vent 43 is provided to space 44 formed in mounting plate 38 so that the outside surface of member 22 will be maintained at atmospheric pressure. Cover member 45 is placed in a recess in housing 10, on the other side of the unit from mounting plate 38 and is held in place by screws 46. Cover plate 45 has a centrally located aperture 47 which is chamfered on its inner face to afford a small-clearance opening in cover 45 to permit it to act as a dirt seal and a vent for space 48 formed in cover 45.

It can be seen that the above-described design of a force-measuring unit affords freedom of movement along the load axis, that is, the axis of bolt 33, with substantial lateral rigidity under such load. It will be seen that the construction of members 21 and 22 act to confine the load to the centerline and limit eccentric loading of the force-measuring device. It will also be noted that the load-sensing element portion, that is beam 15, and the portions on which the strain gages are mounted can be hermetically sealed and an external change in atmospheric pressure which would normally produce large errors in low-range load cells will not produce an appreciable error in this unit because the two end walls 28 and 29 are exposed equally to the same changes in atmospheric pressure.

It will also be noted that cylindrical portions 23 and 24 are wider than the spacing of slots 13, see FIG. 4, so that a substantial portion of cylindrical portions 23 and 24 extend over plate 11 and beyond slots 13. Shims 34 therefore will have a thickness only slightly greater than the deflection desired for the rated range of load. Should the deflection for the range be exceeded, cylindrical portions 23 and 24 will contact plate 11 and prevent damage to the device from overload. It should also be understood that because of the percentage of the total load transmitted to the device, that is, carried by side members 21 and 22, it is possible to adjust the linearity of the load cell both in tension and compression by placing shims 35 between the outer periphery of plates 11 and members 21 and 22, thus changing the pre-load on members 21 and 22 and the linearity characteristics of the complete device. Since portions 28 and 29 carry some portions of the total load transmitted to the device, in accordance with the characteristic force-deflection curve, the linearity of the device, both in tension and compression, may be adjusted or controlled by the employment of shims 35 spaced between members 21 and 22 and plate 11. The shims serve to adjust the loading in side walls 28 and 29 from flat to convex or concave linearity characteristics as required, in the complete unit.

Figure 1:
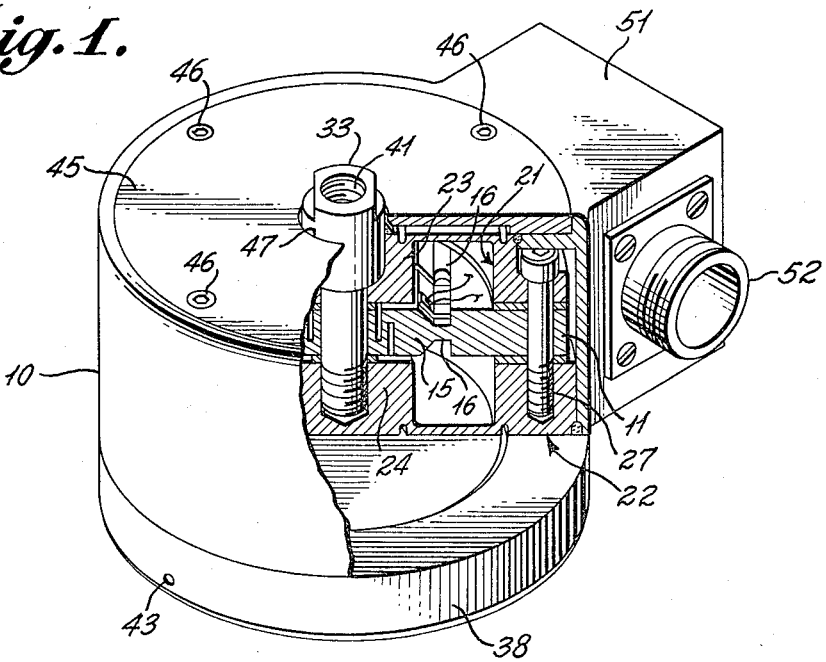
FIG. 1 is a perspective view of the force-measuring device with parts broken away to show certain details of construction.

The strain gages described above may be mounted in any desired number and arranged in grooves 16 at points of high stress concentration of the load-sensing element or at any other place of high stress. The strain gages are connected by leads 50 in a bridge or other circuit. The output signal from the gages or the circuit in which they are connected is carried by wires to an external control and indicating means through their terminals in junction box 51 provided with an electrical connector 52 which is conventional in the art as shown diagrammatically in FIG. 1.

FIG. 4, a fragmentary section taken on the line 4—4, shows more clearly the relationship of the centrally located cylindrical portions 23 and 24 with respect to plate 11 and slots 13. This illustration shows that movement of the assembly of 23, 24 and shims 34 held together by bolt 33, will be stopped against plate 11.

FIGS. 5 and 6 illustrate the application of the invention to a structure in which a load-sensing element is formed with a plurality of arms by milling in two directions at right angles to one another to form a beam having two transverse arms or four radial arms from the center aperture 12' formed in plate 11'. The operation of the lead-sensing element in FIGS. 5 and 6 is the same as the operation of the load-sensing element in FIGS. 1 to 4. It will be noted that the centrally located cylindrical portions 23' and 24' overlap the central portion of plate 11' as shown by portions A. The overload feature is effected by cylindrical portions 23', 24' moving into contact with 11' in the four areas, indicated as A.

It should be understood that the load-sensing beam can comprise any number of radial arms formed by milling in plate 11. It is conceivable that a three-arm beam could readily be employed for some ranges but the number of arms will be determined by load range requirements and practical considerations of manufacture.

FIG. 7 shows how the sensitivity of the load-sensing element may be increased by further milling as shown at 53 and 54 on the portions of beam 15' in grooves 16'.

From the foregoing, it will be understood that the present invention provides an improved force-sensitive device employing strain gages bonded to a load-sensing element whereby a large magnitude of concentrated strain may be measured. The structural arrangement yields a high degree of accuracy coupled with a much lower deflection than heretofore associated with low-range force-measuring transducers. The device of this invention has been shown to be improved by overload protection, that is, adjustable in either tension or compression and unaffected by side loads or couples. Its linearity characteristics may be adjustable in either tension or compression, and it is inherently insensitive to ambient atmospheric pressure changes while remaining hermetically sealed.

It will be obvious to those skilled in the art that various changes may be made in the structure of the invention disclosed, without departing from the spirit thereof. The invention is therefore not limited to that which is shown in the drawings and described in the specification, but only as indicated by the appended claims.

What is claimed is:

1. A force measuring device comprising a force sensing element formed in a plate member mounted transversely to the axis of the applied force and including strain sensing transducer means, said plate member being supported between a pair of load receiving members having centrally located load transmitting portions to transmit the applied force to said force sensing element, said load receiving members having rim portions joined to the periphery of said plate member and side walls on said load receiving members spaced from said plate member and extending between said load transmitting portions and said rim portions, a protective housing formed internally to receive said plate and load receiving members with a sliding fit, said plate and load receiving members being secured in said housing by welding, plate means secured to one side of said housing facing one of said load receiving members having means formed therein to secure said measuring device against reaction to the applied force, said plate means being hollowed out on the side facing said load receiving member to form a chamber therebetween, vent means formed in said plate means to vent said chamber, a second plate means mounted on the opposite side of said housing and being hollowed out to form a second chamber between said second plate means and the other of said load receiving members, said second plate having a centrally located aperture formed therein, and means to apply force to said device protruding freely through said aperture and connected to at least one of said load transmitting portions.

2. In a force measuring device, a plate member having formed therein a force sensing element adapted to be stressed relative to fixed adjacent portions of said plate member by loads applied to said sensing element along an axis normal to the plane of said plate member, load receiving members on opposite sides of said plate member and secured thereto around the edge of said plate member, said load receiving members having centrally located load transmitting portions overlying but spaced from both said force sensing element and said fixed adjacent plate portions, and means bridging only the gaps between said load transmitting portions and said force sensing element.

3. In a force measuring device, a plate having a central opening, a force sensing element bridging part of said opening, a pair of load receiving members on opposite sides of said plate and having radially outer mounting rims secured to said plate and central load transmitting portions positioned over and coupled to said force sensing element, said central portions being of sufficient size to overlap portions of said plate which border said central opening but being spaced therefrom, and means for preloading said load receiving members for regulating the linearity characteristics of said force measuring device.

References Cited by the Examiner
UNITED STATES PATENTS

| | | | |
|---|---|---|---|
| 2,969,514 | 1/1961 | Curtis | 73—398 X |
| 3,022,672 | 2/1962 | Dimeff et al. | 73—398 |
| 3,168,718 | 2/1965 | Swartz et al. | 73—88.5 X |
| 3,168,826 | 2/1965 | Paetow | 73—141 |
| 3,180,139 | 4/1965 | Soderholm | 73—141 |

RICHARD C. QUEISSER, *Primary Examiner.*

CHARLES R. RUEHL, *Assistant Examiner.*